United States Patent [19]
Kohmoto et al.

[11] Patent Number: 5,148,199
[45] Date of Patent: Sep. 15, 1992

[54] MOTOR-DRIVEN ZOOM LENS BARREL

[75] Inventors: Shinsuke Kohmoto; Tetsuo Sekiguchi; Takuji Hamasaki, all of Tokyo, Japan

[73] Assignee: Asahi Kogaku Kogyo Kabushiki Kaisha, Tokyo, Japan

[21] Appl. No.: 651,555

[22] Filed: Feb. 6, 1991

[30] Foreign Application Priority Data

Feb. 8, 1990 [JP] Japan .................................. 2-28902
Feb. 8, 1990 [JP] Japan .................................. 2-28903

[51] Int. Cl.$^5$ .................................................. G03B 3/10
[52] U.S. Cl. .................................................. 354/195.1
[58] Field of Search .................. 354/195.1, 195.12; 359/696, 705, 706

[56] References Cited

U.S. PATENT DOCUMENTS

| | | | |
|---|---|---|---|
| 4,002,405 | 1/1977 | Stahl | 354/195.1 X |
| 4,445,757 | 5/1984 | Enomoto et al. | 354/195.12 X |
| 4,553,817 | 11/1985 | Ando et al. | 354/400 X |
| 4,568,165 | 2/1986 | Ishibashi | 354/195.1 |
| 4,596,449 | 6/1986 | Iwata et al. | 350/429 |
| 4,676,605 | 6/1987 | Toda et al. | 350/429 |
| 4,750,821 | 6/1988 | Yamamoto et al. | 350/429 |
| 4,816,859 | 3/1989 | Maruyana et al. | 354/195.1 X |
| 4,851,869 | 7/1989 | Ishimaru et al. | 354/195.1 |
| 4,896,179 | 1/1990 | Watanabe | 354/195.1 |

FOREIGN PATENT DOCUMENTS

| | | |
|---|---|---|
| 3415424 | 12/1984 | Fed. Rep. of Germany . |
| 3801360 | 7/1988 | Fed. Rep. of Germany . |
| 62-272215 | 11/1987 | Japan . |
| 63-11613 | 1/1988 | Japan . |
| 1140566 | 1/1969 | United Kingdom . |
| 1549729 | 8/1979 | United Kingdom . |

OTHER PUBLICATIONS

French Search Report and Annex, Application No. 9,101,458, Jul. 17, 1991.
Copy of United Kingdom Search Report, Application No. 9102621.1, Apr. 23, 1991.

Primary Examiner—Michael L. Gellner
Attorney, Agent, or Firm—Sandler, Greenblum & Bernstein

[57] ABSTRACT

A motor-driven zoom lens barrel including a zoom motor, a powered zooming mechanism which varies the focal length of a taking lens in accordance with the rotation of the zoom motor in the forward and reverse directions, a zoom operation ring which can be rotated, a rotational direction control circuit for rotating the zoom motor in the forward and reverse directions in accordance with the rotation of the zoom operation ring in the forward and reverse directions from a neutral position thereof, and a speed control circuit for controlling the rotational speed of the zoom motor in accordance with the angular displacement of the zoom operation ring from the neutral position.

20 Claims, 6 Drawing Sheets

MOTOR-DRIVEN ZOOM LENS BARREL

BACKGROUND OF THE INVENTION

1. Field of the Invention

The present invention relates to a motor-driven zoom lens barrel in which the zooming can be driven by a motor.

2. Description of Related Art

In a known motor-driven zoom lens barrel, a switching lever which actuates a clutch is provided to select the powered zooming operation or the manual zooming operation. However, the presence of the switching lever makes it difficult in terms of space to also provide a driving switch, for selectively rotating the motor in the forward or reverse directions and a manual zooming operation ring within the limited space of the lens barrel, since the lens barrel has various operational members including an existing focusing ring, a diaphragm adjusting ring, etc. Also, the operation of the camera becomes complex. Furthermore, it is necessary to provide an adjusting resistance to adjust the zooming speed.

SUMMARY OF THE INVENTION

The primary object of the present invention is to provide a motor-driven zoom lens barrel in which the zooming switch, the zooming direction (telephoto direction and wide angle direction), and the zooming speed can be controlled by a zoom operation ring, and to provide a back-up function that when no operational power is applied, the motor is automatically stopped.

Another object of the present invention is to provide a motor-driven zoom lens barrel in which the powered mode and the manual mode can be switched by the zoom operation ring.

The present invention features a zoom operation ring which rotates in the forward direction and the reverse direction from a neutral position to perform zooming. The zooming speed is controlled by the angular displacement of the zoom operation ring. When a photographer's hand releases the zoom operation ring, the motor is automatically stopped.

The present invention is also characterized by a zoom operation ring which can not only rotate but also move in the optical axis direction. When it moves in the optical axis direction, the zoom operation ring is selectively associated with a manual zooming member and a switch member. When the manual zooming member and the switch member are rotated through the zoom operation ring, the manual zooming and the powered zooming are effected, respectively.

To achieve the object mentioned above, according to the present invention, there is provided a motor-driven zoom lens barrel comprising a zoom motor, and a powered zooming mechanism which varies the focal length in accordance with the rotation of the zoom motor in the forward and reverse directions. A zoom operation ring which can be rotated, and a rotational direction control means for rotating the zoom motor in the forward and reverse directions in accordance with the rotation of the zoom operation ring in the forward and reverse directions from a neutral position thereof are provided a speed control means for controlling the rotational speed of the zoom motor in accordance with the angular displacement of the zoom operation ring from the neutral position, and a returning mechanism which returns the zoom operation ring to a neutral position when no operational force is applied to the zoom operation ring are also provided.

Preferably, provision is also made for a switch member, which supports the zoom operation ring to move in the optical axis direction and which is made integral with the zoom operation ring at a specific position of the zoom operation ring in the optical axis direction, to actuate the rotational direction control means and the speed control means. Consequently, powered zooming can be effected only when the zoom operation ring is moved to a specific position in the optical axis direction.

In an embodiment of the present invention, a returning mechanism is provided to return the zoom operation ring to a neutral position when no operational force is applied to the zoom operation ring.

Preferably, a zoom lens barrel of the present invention further comprises a rotatable manual zoom member which is made integral with the zoom operation ring at another specific position of the zoom operation ring in the optical axis direction, so as to move together in the optical axis direction, and a manual zoom mechanism which operates in accordance with the rotation of the rotatable manual zoom member, whereby the manual zooming also can be effected by the single zoom operation ring.

For example, the returning mechanism is comprised of at least one returning post provided on the zoom operation ring or the switch member and a pair of spring members which engage with the returning post. The spring members are selectively and elastically deformed when the zoom operation ring or the switch member is moved from the neutral position.

Alternatively, the returning mechanism can be comprised of a pair of returning posts, which are provided on the zoom operation ring or the switch member and are circumferentially spaced from one another, a pair of spring abutting members, which have circumferentially elongated holes in which the associated returning posts are fitted, and a pair of spring members which bias the spring abutting members to come away from one another.

According to another aspect of the present invention, the returning mechanism comprises a pair of returning posts which are provided on the zoom operation ring or the switch member to be circumferentially spaced from one another, a pair of neutral posts which are provided on an immovable portion of the zoom lens barrel to correspond to the returning posts, a pair of returning levers which can be simultaneously engaged by the returning posts and the neutral posts from the outside on the opposite sides thereof, and a biasing mechanism for biasing the returning levers to come close to each other.

The present disclosure relates to subject matter contained in Japanese patent applications Nos. 2-28902 and 2-28903 (both filed on Feb. 8, 1990) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

The illustrated embodiments are applied to a two-lens-group type of motor-driven zoom lens. The front lens group L1 is secured to a front lens frame 11 which is engaged by a helicoid ring 12 through a helicoid H. The front lens frame 11 has a linear movement guide projection 11a which is fitted in a linear movement guide groove 13a which is formed in a focusing ring 13 to extend in the optical axis direction.

A rear lens group L2 is secured to a rear lens frame 14 which has provided on its outer peripheral surface, a radial pin (not shown) which is fitted in a cam groove (not shown) formed in a cam ring 15. A stop (diaphragm) holding ring 16 has provided on its outer periphery, a radial pin which is fitted in a cam groove (not shown) formed in the cam ring 15, similar to the rear lens frame 14. The cam ring 15 is rotatably supported in the inner periphery of a stationary ring 17. The rear lens frame 14 and the stop holding ring 16, both fitted in the stationary ring 17, are supported by a linear movement guide mechanism (not shown), provided between the stationary ring 17, and the rear lens frame 14 and the stop holding ring 16, so as to move only in the optical axis direction without rotating. Consequently, when the cam ring 15 rotates, the rear lens frame 14 and the stop holding ring 16 are moved in the optical axis direction in accordance with a predetermined relation determined by the profile of the cam grooves provided on the cam ring 15.

The diaphragm (stop) holding ring 16 has a light intercepting ring 19 and diaphragm blades 18 which are opened and closed by a stop lever 21 projecting rearwardly from a mount ring 20. The diaphragm actuating mechanism per se is well known.

The helicoid ring 12 has a cam groove (not shown) in which a radial pin provided on the cam ring 15, is fitted, so that when the cam ring 15 rotates, the front lens frame 11 is moved forwardly in the optical axis direction in accordance with the linear movement guide groove 13a through the helicoid ring 12. Specifically, when the cam ring 15 rotates, the front lens group L1 and the rear lens group L2 move in the optical axis direction to change the spatial distance therebetween in a predetermined relation, to effect zooming.

The cam ring 15 is rotatably driven by a motor 22. The motor 22 is secured to and in the lens together with the stationary ring 17. The cam ring 15 can also be rotated by a manual lever 23 projecting in the radial direction therefrom.

The focusing ring 13 is rotated by an AF shaft 24 which has at the rear end thereof a joint 24a which faces to the outer (rear end) face of the mount ring 20, so that the AF shaft 24 can be rotated by an AF shaft on the camera body side. The AF shaft 24 has, at its front end a gear 24b which is engaged by an internal gear 13b of the focusing ring 13. Consequently, when the AF shaft 24 rotates, the focusing ring 13 is rotated, so that the front lens frame 11 is rotated together with the focusing ring 13 in accordance with the engagement relation between the linear movement guide groove 13a and the linear movement guide projection 11a. When the front lens frame 11 (front lens group L1) rotates, it is moved in the optical axis direction in accordance with the helicoid H to effect focusing.

A stationary ring 25 is positioned to surround the focusing ring 13. A zoom operation ring 26, a switch ring 27 and a manual zoom ring 28 are rotatably supported on the stationary ring 25.

Figure 2:
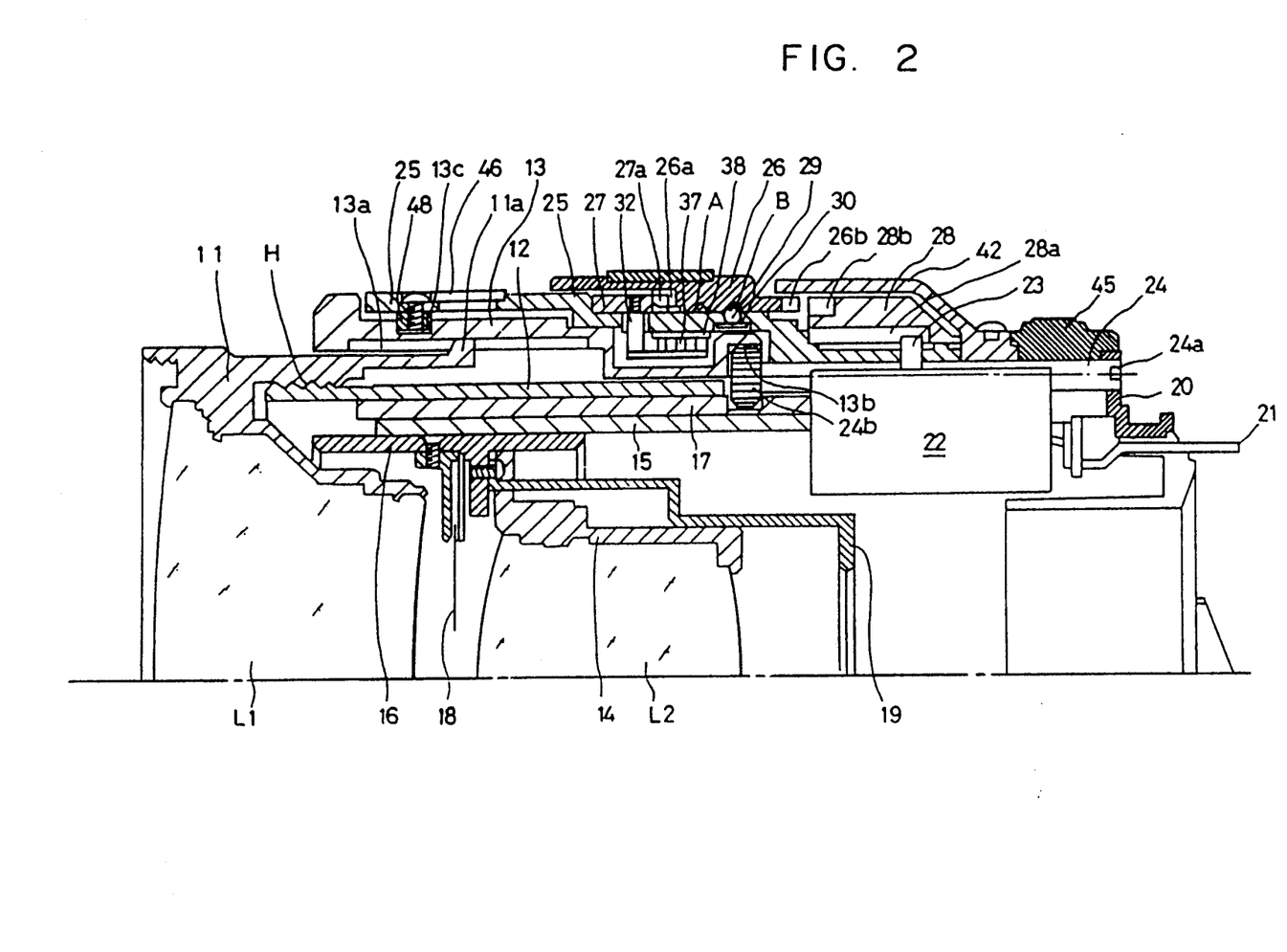
FIG. 2 is a sectional view of a motor-driven zoom lens barrel in a telephoto position, according to the present invention.

The zoom operation ring 26 is provided on its inner peripheral surface with two circumferential V-grooves A and B. The stationary ring 25 has a click ball 29, which is fitted in the V-groove A or B, and a leaf spring 30, which biases the click ball 29 outwardly in the radial direction, as shown in FIG. 2. The zoom operation ring 26 is movable in the optical axis direction between a first position in which the click ball 29 engages in the V-groove A, and a second position in which the click ball 29 engages in the V-groove B. These two positions are stable positions.

Figure 1:
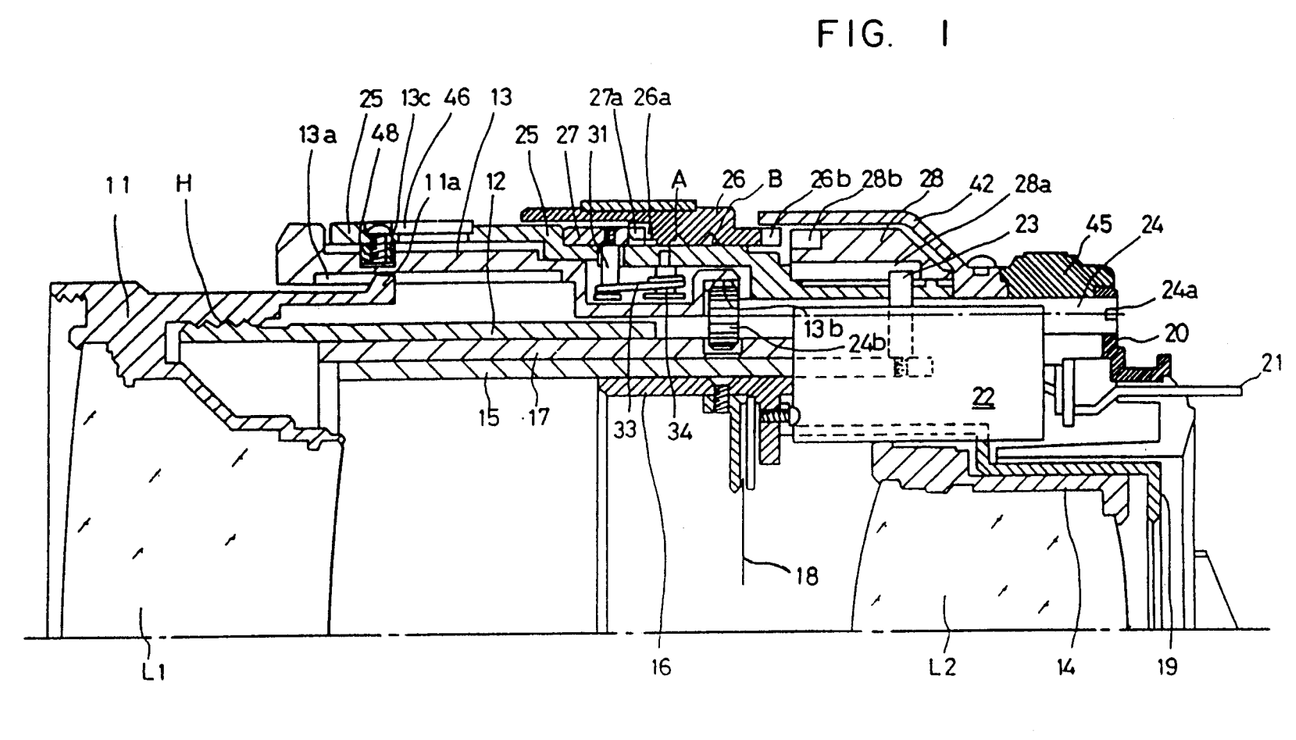
FIG. 1 is a sectional view of a motor-driven zoom lens barrel in a wide angle position, according to the present invention.

The switch ring 27 has a returning post 31 (FIG. 1) which projects inwardly through a through hole of the stationary ring 25 and a brush pin 32 (FIG. 2).

Figure 6A:
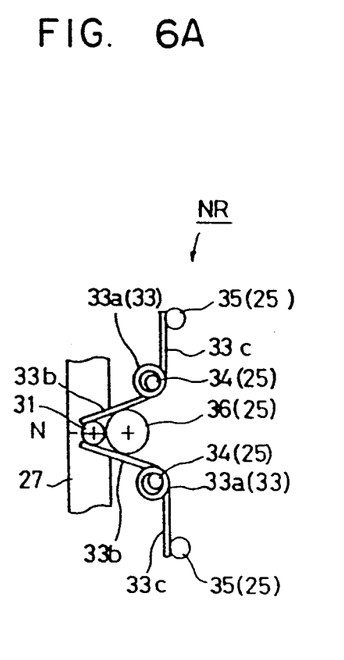
FIGS. 6A and 6B are developed plan views of a main part of a returning device which returns a switch ring to a neutral position, shown in a neutral position and a zooming position, respectively.
Figure 6B:
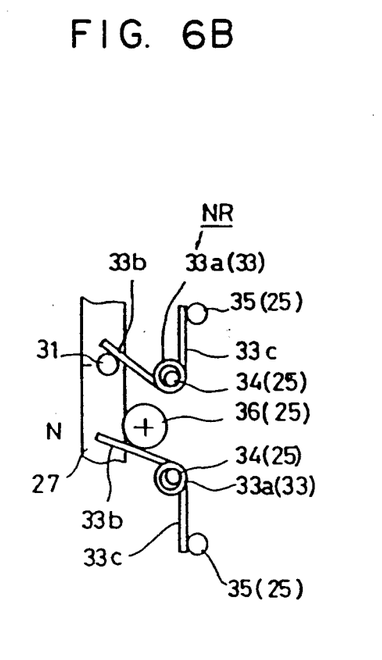

The returning post 31 is one of the constituent elements of a returning mechanism NR, for returning the switch ring 27 to the neutral position, as shown in FIGS. 6A and 6B. The returning post 31 symmetrically receives the rotational biasing force by a pair of return springs 33 supported on the stationary ring 25, so that when no external force is applied to the switch ring 27, the returning post 31 and accordingly the switch ring 27 are returned to the neutral position N. Namely, the pair of return springs 33, which are located in a circumferentially symmetrical arrangement with respect to the returning post 31, have central coiled portions 33a which are fitted on the pins 34 of the stationary ring 25, and opposite end leg portions 33b and 33c, which are engaged by the returning post 31 and the pins 35 of the stationary ring 25, respectively. The leg portions 33b also abut a neutral post 36 on the stationary ring 25 opposite to the returning post 31.

Figure 5:
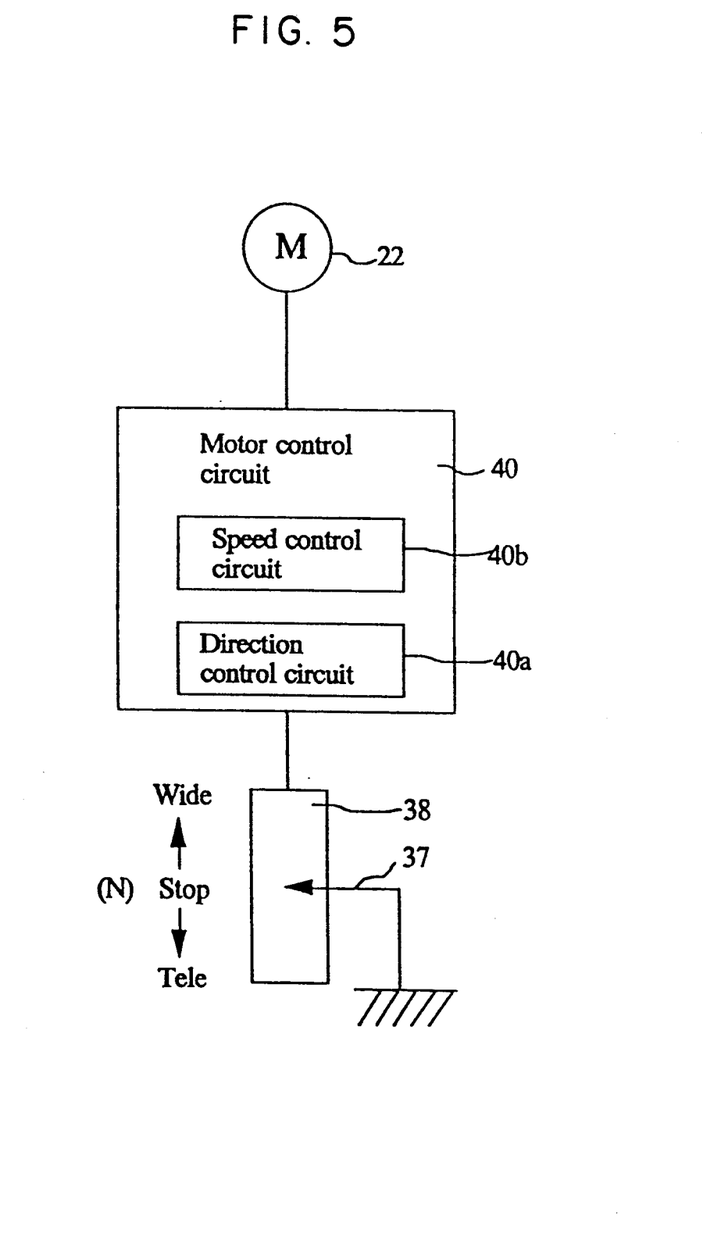
FIG. 5 is a block diagram of a control unit of a motor in the motor-driven zoom lens barrel shown in FIG. 3.

The brush pin 32 is provided on its inner end with a brush 37 secured thereto, which is in contact with a code plate 38 secured to the inner peripheral surface of the stationary ring 25. The brush 37 and the code plate 38 detect the direction of the rotation and angular displacement of the switch ring 27 from the neutral position N. The detected data is input to a motor control circuit 40. The motor control circuit 40 receives the input data to control the direction and speed of rotation of the motor 22 through a direction control circuit 40a and a speed control circuit 40b, respectively, as shown in FIG. 5.

The manual zoom ring 28 is supported by a stepped portion of the stationary ring 25 and a cover ring 42 secured to the rear end of the stationary ring 25 so as not to move in the optical axis direction. The cover ring 42 covers the manual zoom ring 28, so that no operational force can be applied thereto. The manual zoom ring 28 is provided on its inner peripheral surface with a linear groove 28a extending in the optical axis direction. The manual lever 23 is fitted in the linear groove 28a. Note that the linear groove 28a is provided only for assembly, so that neither the manual lever 23 nor the manual zoom ring 28 move in the optical axis direction.

Figure 4:
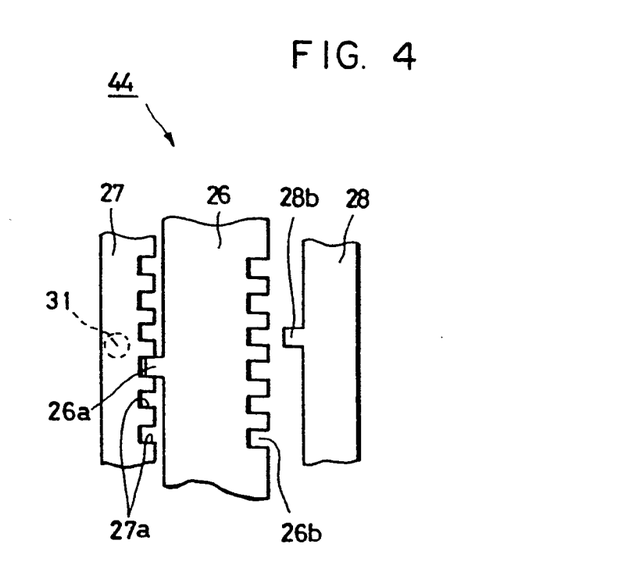
FIG. 4 is a developed view of a switch ring, a zoom operation ring and a manual ring.

On the zoom operation ring 26, the switch ring 27 and the manual zoom ring 28 there is provided a selective engaging mechanism (clutch mechanism) 44 which includes a first clutch projection 26a provided on the side face of the zoom operation ring 26 adjacent to the switch ring 27, and a plurality of first clutch grooves 27a spaced from one another at an equidistance and provided on the switch ring 27, so that the first clutch projection 26a can be selectively engaged in one of the clutch grooves 27a, as shown in FIG. 4. The zoom operation ring 26 is provided, on the side thereof, adjacent to the manual zoom ring 28, with a plurality of second clutch grooves 26b spaced from one another at an equidistance. The manual zoom ring 28 has a second clutch projection 28b which can be selectively engaged in one of the second clutch grooves 26b. These clutch projections 26a and 28b cannot be simultaneously engaged in the corresponding clutch grooves 27a and 26b. Specifically, when the click ball 29 is engaged in the V-groove B, by the forward movement of the zoom operation ring 26, the clutch projection 26a is selectively engaged is in the clutch grooves 27a, and when the click ball 29 engaged in the V-groove A, by the backward movement of the zoom operation ring 26, the clutch projection 28b is selectively engaged in the clutch grooves 26b, respectively.

Figure 3:
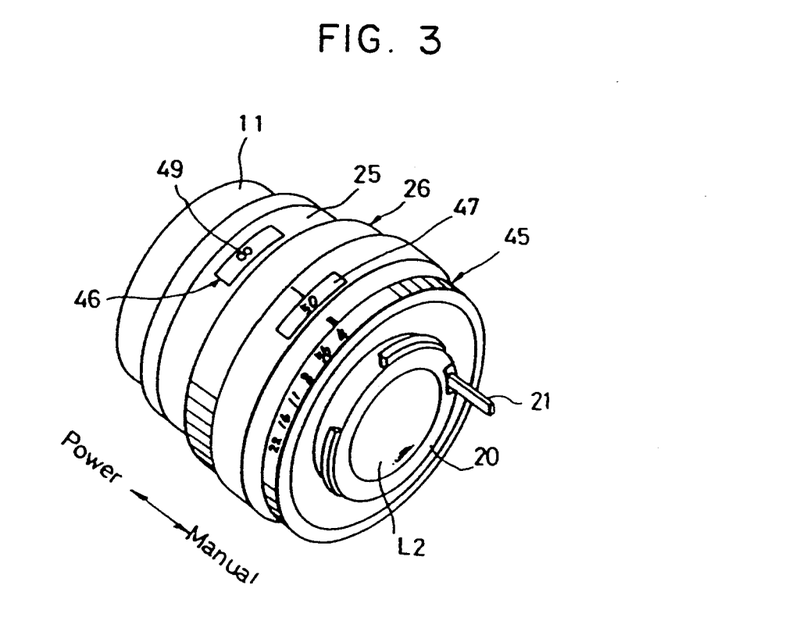
FIG. 3 is a perspective view of a motor-driven zoom lens barrel shown in FIGS. 1 and 2.

A stop (diaphragm) dial ring 45 is rotatably supported on the rear end of the cover ring 42. The stationary ring 25 has an object distance window (opening) 46, and the cover ring 42 has a focal length window (opening) 47, as shown in FIG. 3. The stationary ring 25 has a restricting projection 48 secured thereto to restrict the angular displacement of the focusing ring 13. An object distance dial 49, applied to the outer peripheral surface of the focusing ring 13, can be observed through the object distance window 46. A focal length dial 50 applied to the outer peripheral surface of the manual zoom ring 28 can be observed through the focal length window 47. The restricting projection 48 is fitted in a circumferential groove 13c which is formed on the outer periphery of the focusing ring 13 within a predetermined angular range to restrict the angular displacement of the focusing ring 13 within the angular range.

In the motor-driven zoom lens barrel as constructed above, the powered zoom mode is obtained when the click ball 29 is engaged in the V-groove B in accordance with the forward movement of the zoom operation ring 26. In this state, the zoom operation ring 26 and the switch ring 27 are made integral with each other in the direction of rotation by the selective engagement of the clutch projection 26a in the clutch grooves 27a. When the switch ring 27 is rotated in one direction through the zoom operation ring 26 from the neutral position N, the brush 37 and the code plate 38 detect the direction of the rotational movement, so that the direction control circuit 40a of the motor control circuit 40 rotates the motor 22 in the forward direction or the reverse direction. Namely, the zooming direction toward the telephoto extremity or the wide angle extremity can be controlled by the direction of the rotation of the zoom operation ring 26. The brush 37 and the code plate 38 also detect the angular displacement of the switch ring 27 and accordingly the zoom operation ring 26, so that the speed control circuit 40b of the motor control circuit 40 increases the number of revolutions of the motor 22 as the detected angular displacement becomes large. When the motor 22 is driven, the cam ring 15 is rotated, so that the front lens group L1, the rear lens group L2 and the diaphragm holding ring 16 are moved in the optical axis direction, in a predetermined relation, to effect zooming.

The zooming speed can be either continuously or discontinuously varied in accordance with the code data of the code plate 38 or the signal processing thereof.

When the zoom operation ring 26 is rotated in the forward direction or the reverse direction from the neutral position N, only one of the return springs 33 is elastically deformed as shown in FIG. 6B. When the operational force is released, the switch ring 27 is returned to the neutral position N by the restoring force of the leg portion 33b of the deformed return spring 33 through the returning post 31. As a result, the motor 22 is stopped. Upon returning, the returning post 31 prevents the excess deformation of the leg portion 33, so that the switch ring 27 cannot rotate beyond the neutral position N. The return movement mentioned above is equally effected regardless of the forward or reverse direction of the zoom operation ring 26 (telephoto direction or wide angle direction).

The manual zoom mode is obtained when the click ball 29 is engaged in the circumferential V-groove A by the backward movement of the zoom operation ring 26. In this state, the clutch projection 28b is selectively engaged in the clutch grooves 26b to make the zoom operation ring 26 integral with the manual zoom ring 28 in the direction of the rotation. Consequently, when the zoom operation ring 26 is rotated, the cam ring 15 is rotated through the linear groove 28a and the manual lever 23 to effect zooming. In this manual zoom mode, since the zoom operation ring 26 is disengaged from the switch ring 27, no spring force of the return springs 33 acts on the zoom operation ring 26, so that the zoom operation ring 26 is free to rotate together with the cam ring 15.

The difference between the powered mode and the manual mode resides only in that the cam ring 15 is automatically rotated by the motor 22 in the powered mode and manually rotated by the manual lever 23 in the manual mode to effect the zooming.

In the manual zoom mode, although the cam ring 15 is rotated together with the manual lever 23 to rotate the manual zoom ring 28, since the manual zoom ring 28 is not engaged by the zoom operation ring 26, no rotation of the zoom operation ring 26 occurs. Furthermore, since the manual zoom ring 28 is covered by the cover ring 42, the photographer can be protected from the rotating manual zoom ring 28.

Figure 6C:
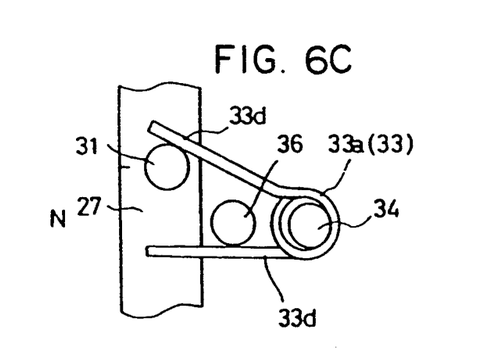
FIG. 6C is a developed plan view of a main part of a returning device which returns a switch ring to a neutral position, according to another embodiment of the present invention; and, FIGS. 7A and 7B, 8A and 8B, and 9A and 9B are developed plan views of a main part of a returning device which returns a switch ring (zoom operation ring) to a neutral position, shown in a neutral position and a zooming position, according to still another aspect of the present invention, respectively.

FIG. 6C shows another embodiment of the returning mechanism NR for returning the switch ring to the neutral position. In this modified embodiment, only one return coil spring 33 and one pin 34 are provided. A pair of leg portions 33d of the return spring 33 abut the neutral post 36 and the returning post 31 on the opposite sides. In this embodiment, the switch ring can be returned to the neutral position N, similarly to the first embodiment.

Figure 7A:
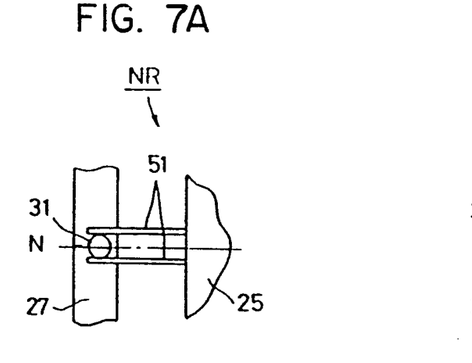
Figure 7B:
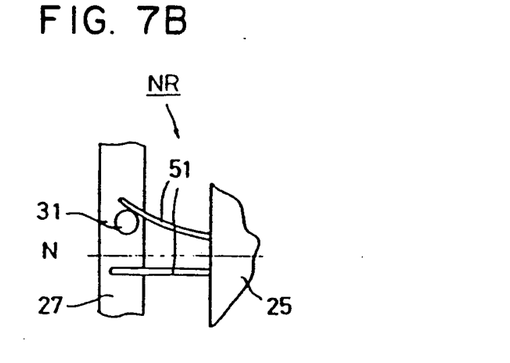

FIGS. 7A and 7B show still another embodiment of the returning mechanism for returning the switch ring to the neutral position. In this embodiment, a pair of leaf springs 51 are provided instead of a pair of coil springs 33, as in the first embodiment. The leaf springs 51 are secured at their one end to the stationary ring 25 and abut the opposite sides of the returning post 31 provided on the switch ring 27 at the other ends of the leaf springs 51. Consequently, when the switch ring 27 is rotated in one direction from the neutral position N, one of the leaf springs 51 is elastically deformed, as shown in FIG. 7B, so that the returning force is applied to the switch ring 27. Accordingly, when the operational force is released, the switch ring 27 is returned to the neutral position by the restoring force of the deformed leaf spring 51, as shown in FIG. 7A.

Figure 8A:
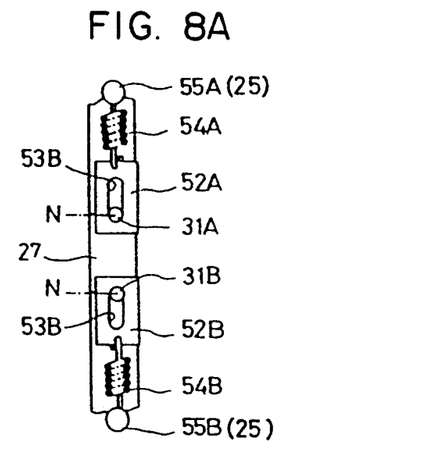
Figure 8B:
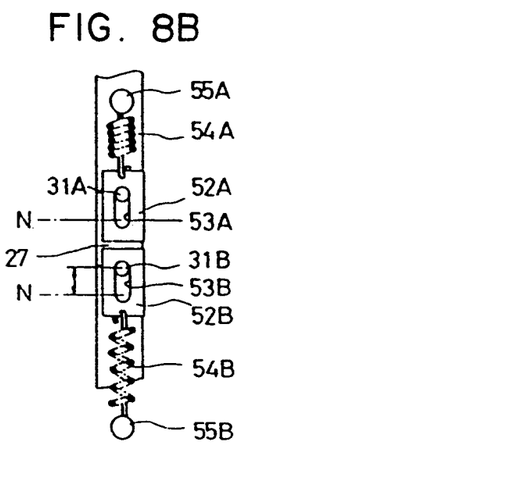

FIGS. 8A and 8B show another embodiment of a returning mechanism NR for returning the switch ring to the neutral position. In this embodiment, a pair of returning posts 31A and 31B are provided on the switch ring 27 to be circumferentially spaced from one another at a predetermined distance. The returning posts 31A and 31B are fitted in a pair of elongated holes 53A and 53B of spring abutting members 52A and 52B which are movably supported on the switch ring 27 so as to move in the circumferential direction. A pair of tensile springs (return springs) 54A and 54B are symmetrically connected at their one end to the spring abutting members 52A and 52B. The other ends of the tensile springs 54A and 54B are connected to spring abutting pins 55A and 55B which are secured to the stationary ring 25. In the neutral position N, of the switch ring 27, the spring abutting members 52A and 52B are moved by the spring force of the tensile springs 54A and 54B in the opposite directions, so that the returning posts 31A and 31B are placed at the opposite inner ends of the elongated holes 53A and 53B.

In the embodiment shown in FIGS. 8A and 8B, when the switch ring 27 is rotated in one direction from the neutral position N shown in FIG. 8A, one of the tensile springs 54A and 54B is deformed as shown in FIG. 8B by the spring abutting member 52A (or 52B) which moves together with the returning post 31A (or 31B) to apply the returning force to the switch ring 27. The other returning post 31B (or 31A) is moved in the associated elongated hole 53B (or 53A), and accordingly, no deformation of the other tensile spring 54B takes place. Consequently, when the operational force is released, the switch ring 27 is returned to the neutral position N by the spring force of the deformed tensile spring 54B (or 54A).

Figure 9A:
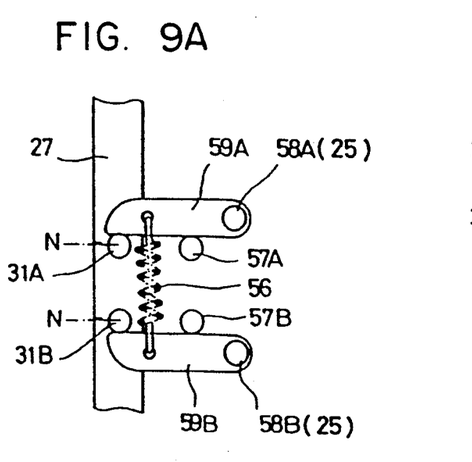
Figure 9B:
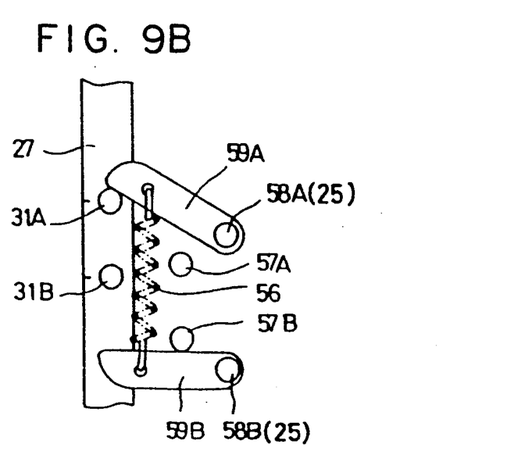

FIGS. 9A and 9B show still another embodiment of a returning mechanism NR for returning the switch ring to the neutral position. In this embodiment, a single tensile spring 56 is provided. The switch ring 27 has thereon returning posts 31A and 31B, which are similar to those in FIGS. 8A and 8B. The stationary ring 25 has a pair of neutral posts 57A and 57B corresponding to the returning posts 31A and 31B. A pair of returning levers 59A and 59B, which are pivoted to the stationary ring 25 through shafts 58A and 58B, are provided outside of the returning post 31A the neutral post 57A, the returning post 31B, and the neutral post 57B, respectively. The single tensile spring 56 is provided between the returning levers 59A and 59B to bias the latter to come close to each other.

In the embodiment shown in FIGS. 9A and 9B, when the switch ring 27 is rotated in one direction from the neutral position N shown in FIG. 9A, one of the returning levers 59A or 59B is swung by the returning post 31A (or 31B). Since the other returning lever 59B (or 59A) is prevented from swinging by the neutral post 57B (or 57A), the tensile spring 56 is tensed to apply the returning force to the switch ring 27. Therefore, when the operational force is released from the switch ring 27, the switch ring 27 is returned to the neutral position N by the spring force of the deformed tensile spring 56, as shown in FIG. 9A.

In the aforementioned embodiment, the single zoom operation ring 26 is selectively engaged by the switch ring 27 or the manual zoom ring 28 to control powered zooming, zooming direction, zooming speed, and manual zooming, etc. Alternatively, if the zoom operation ring 26 is used only for powered zooming, it is possible to make the zoom operation ring 26 integral with the switch ring 26, that is, to make the zoom operation ring 27 and the switch ring 27 of a single piece.

In the illustrated embodiments in which the manual zooming is effected by the zoom operation ring 26, the manual zoom ring 28 is interposed between the zoom operation ring 26 and the manual lever 23 to transmit the rotation of the zoom operation ring 26 to the manual lever 23. However, the manual zoom ring 28 can be dispensed with, if the zoom operation ring 26 is directly engaged by the manual lever 23, so to be integral with each other in the direction of the rotation when the zoom operation ring 26 slides rearwardly.

The subject of the present invention is not directed to the zooming mechanism proper. The present invention can be applied to any type of zooming mechanism in which the motor 22 is rotatably driven in the forward and reverse directions by the rotation of the switch ring 27 in the forward and reverse directions to effect zooming, and manual zooming can be mechanically effected by the rotation of the manual lever 23 in the forward and reverse directions.

We claim:

1. A motor-driven zoom lens barrel comprising:
   a zoom motor;
   a powered zooming mechanism which varies the focal length of a taking lens in accordance with the rotation of the zoom motor in the forward and reverse direction;
   a zoom operation ring which can be rotated for controlling zooming;
   rotational direction control means for rotating said zoom motor in the forward and reverse directions in accordance with the rotation of said zoom operation ring in the forward and reverse direction from a neutral position;
   speed control means for controlling the rotational speed of said zoom motor in accordance with the angular displacement of said zoom operation ring from the neutral position; and
   a returning mechanism which returns said zoom operation ring to a neutral position when no operational force is applied to said zoom operation ring, said zoom operation ring supported so as to move in the optical axis direction of the zoom lens barrel.

2. A motor-driven zoom lens barrel according to claim 1, further comprising a switch member which is made integral with the zoom operation ring, at a first specific position of the zoom operation ring in the optical axis direction, to actuate the rotational direction control means and the speed control means.

3. A motor-driven zoom lens barrel according to claim 2, further comprising a rotatable manual zoom member which is made integral with the zoom operation ring, at a second specific position of the zoom operation ring in the optical axis direction, so as to move together in the optical axis direction, and a manual zoom mechanism which operates in accordance with the rotation of the rotatable manual zoom member.

4. A motor-driven zoom lens barrel according to claim 3, further comprising a cover member which covers the rotatable manual zoom member to prevent access thereto from outside.

5. A motor-driven zoom lens barrel according to claim 2, wherein said returning mechanism comprises at least one returning post provided on the zoom operation ring or the switch member, and a pair of spring members which engage with the returning post.

6. A motor-driven zoom lens barrel according to claim 5, wherein said spring members are selectively and elastically deformed when the zoom operation ring or the switch member is moved from the neutral position.

7. A motor-driven zoom lens barrel according to claim 4, wherein said returning mechanism comprises a pair of returning posts which are provided on the zoom operation ring or the switch member circumferentially spaced from one another, a pair of spring abutting members which have circumferentially elongated holes in which the associated returning posts are fitted, and a pair of spring members which bias the spring abutting members away from one another.

8. A motor-driven zoom lens barrel according to claim 2, wherein said returning mechanism comprises a pair of returning posts which are provided on the zoom operation ring or the switch member, circumferentially spaced from one another, a pair of neutral posts which are provided on an immovable portion of the zoom lens barrel to correspond to the returning posts, a pair of returning levers which can be simultaneously engaged by the returning posts and the neutral posts from the outside on the opposite sides thereof, and a biasing means for biasing the returning levers close to each other.

9. A motor-driven zoom lens barrel according to claim 1, wherein said rotational direction control means and said speed control means comprise a code plate which is provided on the zoom operation ring or an immovable portion of the zoom lens barrel, and a brush which is provided on the immovable portion of the zoom lens barrel or the zoom operation ring so to come into contact with the code plate.

10. A motor-driven zoom lens barrel comprising:
a zoom operation ring which rotatable and movable in the optical axis direction of the zoom lens barrel;
a manual zoom member and a switch member, mounted for selective engagement with said zoom operation ring for rotation with said zoom operation ring in accordance with movement of said zoom operation ring in the optical axis direction;
a manual zoom mechanism for effecting zooming operation when said manual zoom member is rotated by engagement with said zoom operation ring;
motor control means for rotating a zoom motor in the forward and reverse directions in accordance with the rotation of said switch member by engagement with said zoom operation ring; and,
a powered zoom mechanism for effecting zooming operation in accordance with the rotation of said zoom motor in the forward and reverse direction through said motor control means.

11. A motor-driven zoom lens barrel according to claim 10, wherein said motor control means comprises a speed control means for controlling the rotational speed of the zoom motor in accordance with the angular displacement of the switch member from its neutral position.

12. A motor-driven zoom lens barrel according to claim 11, wherein said speed control means comprises a code plate which is provided on the zoom operation ring or an immovable portion of the zoom lens barrel, and a brush which is provided on the immovable portion of the zoom lens barrel or the zoom operation ring so to come into contact with the code plate.

13. A motor-driven zoom lens barrel according to claim 10, further comprising a returning mechanism which returns the switch member to a neutral position when no operational force is applied to the switch member.

14. A motor-driven zoom lens barrel according to claim 10, wherein said returning mechanism comprises at least one returning post provided on the switch member and a pair of spring members which engage the returning post.

15. A motor-driven zoom lens barrel according to claim 14, wherein said spring members are selectively and elastically deformed when the switch member is moved from the neutral position.

16. A motor-driven zoom lens barrel according to claim 10, wherein said returning mechanism comprises a pair of returning posts which are provided on the switch member to be circumferentially spaced from one another, a pair of spring abutting members which have circumferentially elongated holes in which the associated returning posts are fitted, and a pair of spring members which bias the spring abutting members away from one another.

17. A motor-driven zoom lens barrel according to claim 10, wherein said returning mechanism comprises a pair of returning posts which are provided on the switch member to be circumferentially spaced from one another, a pair of neutral posts which are provided on an immovable portion of the zoom lens barrel corresponding to the returning posts, a pair of returning levers which can be simultaneously engaged by the returning posts and the neutral posts from the outside on the opposite sides thereof, and a biasing means for biasing the returning levers close to each other.

18. A zoom lens barrel selectively operable in a manual zooming mode and in a motor driven zooming mode, said zoom lens barrel comprising:
a zoom operation ring mounted for movement along the axial direction of the zoom lens barrel and for rotation about the optical axis of the zoom lens barrel;
wherein axial movement of said zoom operation ring selects between a manual zooming mode and a motor driven zooming mode; and
wherein rotation of said zoom operation ring, in the motor driven zooming mode, controls speed of zooming.

19. The zoom lens barrel according to claim 18 wherein in the manual zooming mode, rotation of said zoom operation ring controls zooming.

20. The zoom lens barrel according to claim 18, said zoom operation ring including a switch members coupled to said zoom operation ring in the motor driven zooming mode and a manual zoom member coupled to said zoom operation ring in the manual zooming mode.

* * * * *

UNITED STATES PATENT AND TRADEMARK OFFICE
CERTIFICATE OF CORRECTION

PATENT NO. : 5,148,199

DATED : September 15, 1992

INVENTOR(S) : S. KOHMOTO et al.

It is certified that error appears in the above-identified patent and that said Letters Patent is hereby corrected as shown below:

On the cover page, Item [56] References Cited", line 8, change "Maruyama et al." to ---Maruyama et al.---.

At column 9, line 53 (claim 10, line 2), insert ---is--- after "which".

At column 10, line 29 (claim 16, line 2) change "10" to ---12---.
At column 10, line 38 (claim 17, line 2) change "10" to ---12---.
At column 10, line 64 (claim 20, line 2), change "members" to ---member---.

Signed and Sealed this

Twenty-eighth Day of December, 1993

Attest:

BRUCE LEHMAN

*Attesting Officer*   *Commissioner of Patents and Trademarks*